(12) United States Patent
Yang et al.

(10) Patent No.: US 7,889,445 B2
(45) Date of Patent: Feb. 15, 2011

(54) LENS ACTUATION DEVICE, OPTICAL SYSTEM AND CAMERA

(75) Inventors: Hua Yang, Shenzhen (CN); Sio Kuan Lam, New Territories (HK); Kwok Sing Cheng, New Territories (HK); Kin Ming Fan, Ma Wan (HK); Wing Ming Fan, New Territories (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 22 days.

(21) Appl. No.: 12/290,543

(22) Filed: Oct. 30, 2008

(65) Prior Publication Data

US 2009/0290242 A1    Nov. 26, 2009

(30) Foreign Application Priority Data

May 21, 2008    (CN) .................. 2008 1 0109066

(51) Int. Cl.
*G02B 7/02* (2006.01)
(52) U.S. Cl. ..................... 359/824; 359/822; 359/823; 359/814
(58) Field of Classification Search .................. 359/824
See application file for complete search history.

(56) References Cited

U.S. PATENT DOCUMENTS 7,295,388 B2   11/2007   Shyu et al.

| | | | |
|---|---|---|---|
| 2006/0034599 A1 | 2/2006 | Osaka | |
| 2006/0146661 A1* | 7/2006 | Ke et al. | 369/44.14 |
| 2007/0147197 A1* | 6/2007 | Huang et al. | 369/44.15 |
| 2007/0154198 A1* | 7/2007 | Oh et al. | 396/85 |
| 2008/0031103 A1* | 2/2008 | Horinouchi et al. | 369/44.37 |
| 2008/0163279 A1* | 7/2008 | Peng et al. | 720/683 |
| 2009/0252488 A1* | 10/2009 | Eromaki et al. | 396/529 |

* cited by examiner

*Primary Examiner*—Jessica T Stultz
(74) *Attorney, Agent, or Firm*—Berkeley Law & Technology Group, LLP (57)    ABSTRACT

A lens actuation device for an optical system includes a housing, a carrier at least partially installed in the housing, and a plurality of transducers arranged around the carrier in the housing. All the transducers are coupled with the mount, and at least one transducer includes at least one magnet and at least one coil. At least one transducer includes at least one yoke. All the transducers when powered on may generate independent or consistent movement to cause the mount to make linear movement, rotation, or both relative to the housing. An optical system adopting the lens actuation device and a camera using the same are also presented. The device of the present invention uses the transducers to drive the carrier, such that the lens set is driven to make linear movement, rotation, or both, thereby achieving the flexible manipulation of the lens.

12 Claims, 9 Drawing Sheets

FIG. 1

Prior Art

LENS ACTUATION DEVICE, OPTICAL SYSTEM AND CAMERA

BACKGROUND OF THE INVENTION

1. Field of Invention

The present invention relates to image-capturing equipment, and in particular, to a lens actuation device, optical system, and camera.

2. Related Art

Figure 1:
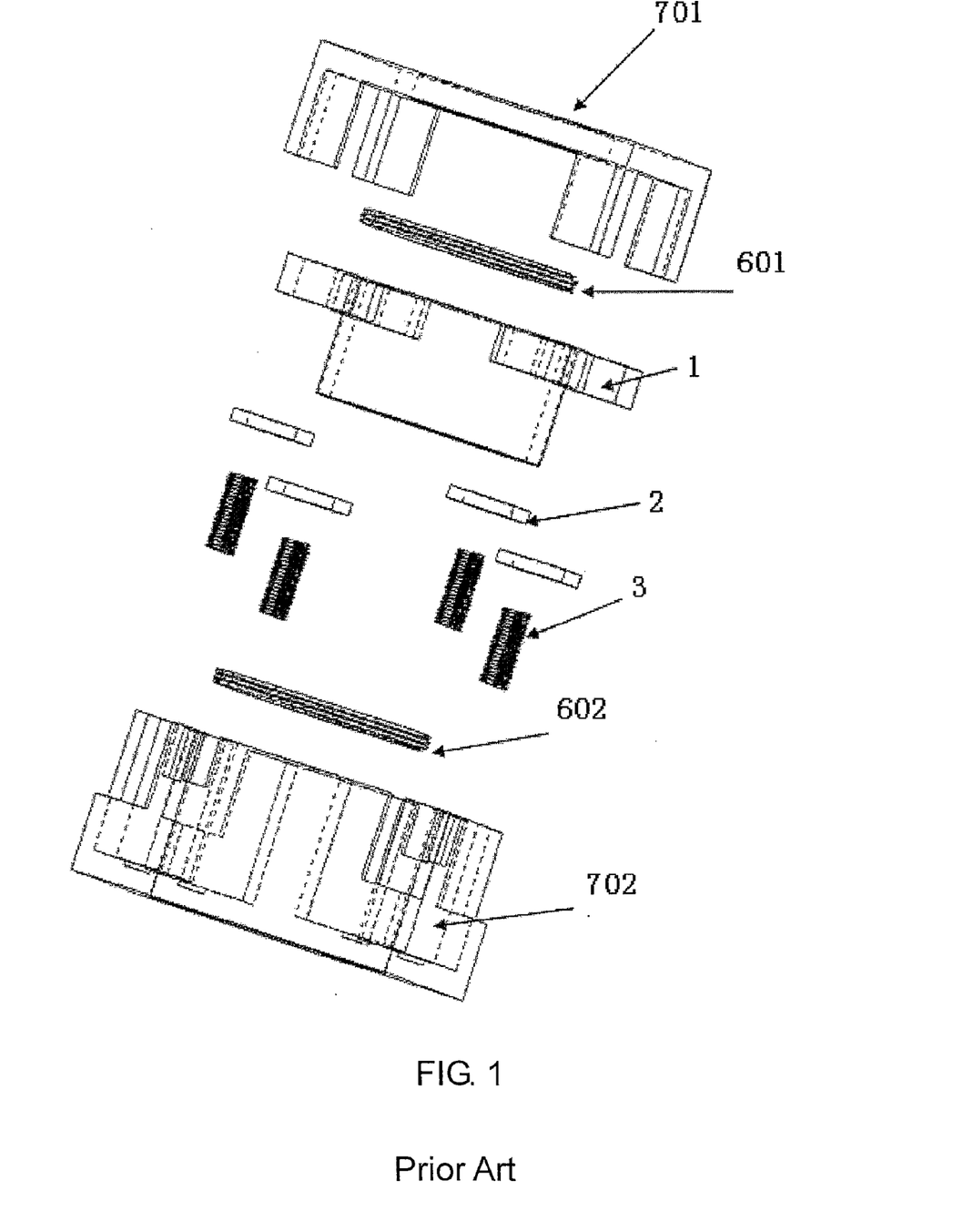
FIG. 1 is a three-dimensional exploded view of a lens actuation device adopting electromagnetic actuation.

The control of the lens portion is critical to the image quality. Through the control and adjustment of the positions of the lens, the zoom, focus, and vibration reduction functions, and the like of the camera lens may be achieved. Currently, the lens drive normally adopts the electromagnetic actuation manner. FIG. 1 is a three-dimensional exploded view of a conventional lens actuation device adopting electromagnetic actuation. The lens actuation device includes a housing consisting of an upper case 701 and a lower case 702. A carrier 1 with hollow middle portion is disposed in the housing, and the lens is fixedly installed in the carrier 1. A magnet 2 and a coil 3 are arranged around the carrier 1, and the coil 3 is fixed (connected) to the carrier 1. Flat springs 601, 602 are respectively disposed between the carrier 1 and the upper and lower cases 701, 702. The magnet 2 and coil 3 constitute the electromagnetic transducer functioning for actuating the carrier 1, and after being powered on, the electromagnetic transducer converts the electromagnetic energy into the mechanical force, and thus the carrier 1 can be driven by the coil 3 to adjust the movement of the lens.

In the above structure, the magnetic field intensity of the magnet attenuates quickly, which results in the non-uniform distribution of the magnetic field in space. Therefore, the following deficiencies are inevitably caused. (1) In the course of the movement of the mount, the action force of the magnetic field applied on the coil is non-uniform, which causes the difficulty in effectively controlling the movement of the mount. (2) Due to the attenuation of the magnetic field intensity, in order to sustain a stable action force of the coil and magnetic field, the current needs to be increased, and consequently the power consumption increases.

SUMMARY OF THE INVENTION

The present invention is directed to overcome the above deficiencies and solve the problem of non-uniform distribution of the magnetic field, and improves the intensity and uniformity of the magnetic field, thereby greatly reducing the power consumption and the difficulty in controlling the movement of the mount.

In order to achieve the above objectives, the present invention provides a lens actuation device for an optical system. The lens actuation device includes a housing, a carrier at least partially arranged in the housing, and a plurality of transducers disposed around the carrier and coupled with the carrier. At least one transducer includes at least one magnet and at least one coil, and at least one transducer includes at least one yoke.

The yoke may consist of one or a plurality of magnetic conductors. At least one transducer may be independently equipped with at least one yoke, or share at least one yoke with at least another transducer.

Furthermore, the lens actuation device further includes one or a plurality of springs having one end in contact with the carrier, and the other end in contact with the housing or an accessory fixed on the housing. The springs are coil springs with diameters larger than an inner diameter of the carrier and aligned with a central axis of the carrier.

The springs may also be flat springs arranged on periphery of the carrier.

The transducers are individually controlled to make independent movement, so as to achieve rotation or sway of the carrier. The rotation or sway may be used for image stabilization or vibration compensation of the photographic system.

The transducers may also be cooperatively controlled to make substantially the same movement consistently so as to achieve linear movement of the carrier. The linear movement of the carrier along the central axis may achieve the auto-focus function of the lens.

The transducers may be accurately controlled to make consistent movement or independent movement at any time, and switch between two movement modes, thereby achieving independent linear movement, independent rotation, or sway or a combined movement of any two of the above movements of the carrier. Therefore, the independent auto-focus function, independent vibration compensation function, or both can be achieved.

At least one transducer is a piezoelectric actuator or transducer.

In order to achieve the above objective, the present invention further provides an optical system, which includes a lens actuation device and a lens arranged in the carrier of the lens actuation device.

In order to achieve the above objective, the present invention further provides a camera, which includes a lens actuation device, a lens arranged in the carrier of the lens actuation device, a camera sensor, spacer arranged between the lens actuation device and the camera sensor, and a controller for driving the transducers of the lens actuation device.

The present invention achieves the following effects.

In the lens actuation device of the present invention, at least two transducers are respectively coupled with the carrier. Each transducer includes at least one magnet and at least one coil, and at least one transducer includes at least one yoke. All or a part of the transducers own or share at least one yoke. In this manner, the transducers are individually controlled to output consistent or different drive force, so as to control the linear movement along the central axis, oblique movement deviated from the central axis, rotation or sway, and a combined movement of linear movement and rotation or sway of the carrier. The lens actuation device of the present invention achieves a better driving control performance of the carrier. In detail, the transducers can be individually controlled to generate independent movement, so as to achieve the rotation or sway of the carrier. The rotation or sway may be used for image stabilization or vibration compensation of the photographic system. The transducers may be cooperatively controlled to make consistent movement, thereby achieving the linear movement of the carrier. The linear movement of the carrier along central axis may achieve the auto-focus function of the camera lens. The transducers may be accurately controlled to make consistent movement or independent movement at any time, and switch between two movement modes, thereby achieving independent linear movement, independent rotation, or sway or a combined movement of any two of the above movements of the carrier. Therefore, the independent auto-focus function, independent vibration compensation function, or both can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein:

FIG. 2b is a cross-sectional view of the lens actuation device taken along line A-A of FIG. 2a;

FIG. 2c a three-dimensional exploded view of the lens actuation device of FIG. 2a;

FIG. 3b is a cross-sectional view of the lens actuation device taken along line A-A of FIG. 3a;

FIG. 3c is a three-dimensional exploded view of the lens actuation device of FIG. 3a;

FIG. 4b is a cross-sectional view of the lens actuation device taken along line A-A of FIG. 4a;

FIG. 4c is a three-dimensional exploded view of the lens actuation device of FIG. 4a;

FIG. 4d is a schematic cross-sectional view of the lens actuation device of FIG. 4a;

DETAILED DESCRIPTION OF THE INVENTION

The features and advantages of the present invention will be illustrated in detail below with reference to the embodiments and accompanying drawings.

First Embodiment

Figure 2A:
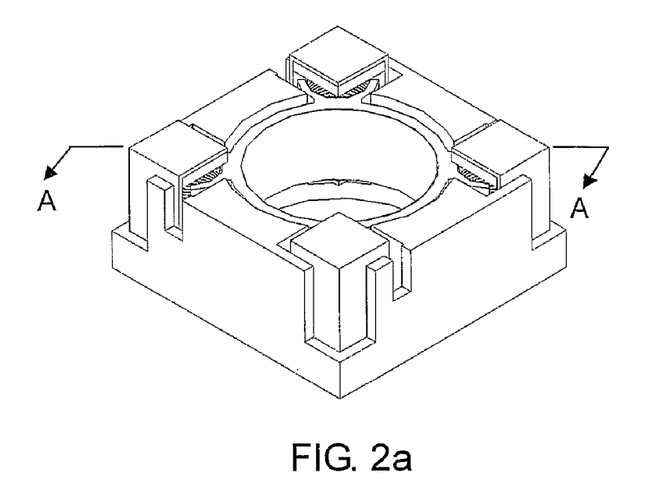
FIG. 2a is a three-dimensional view of a lens actuation device (without an upper case) according to an embodiment of the present invention.
Figure 2B:
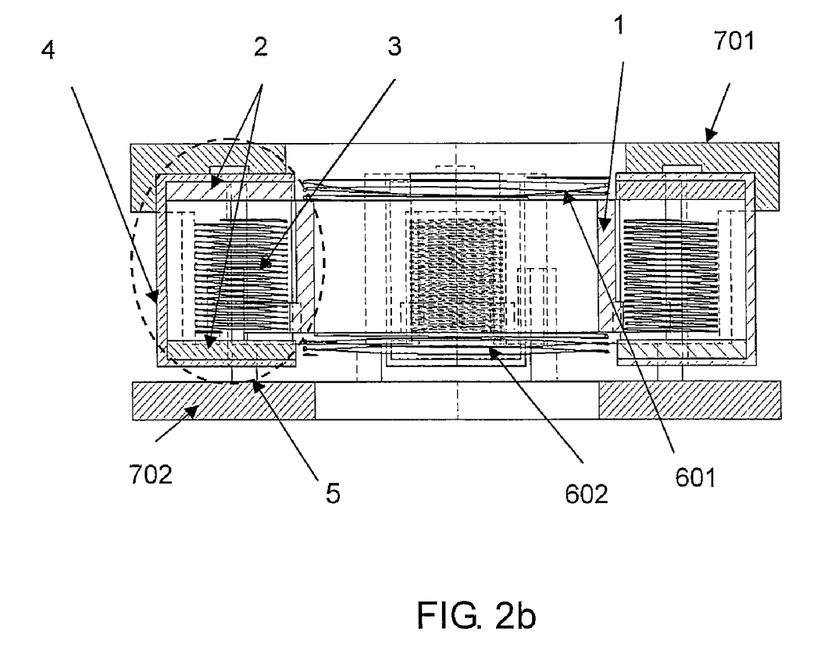
Figure 2C:
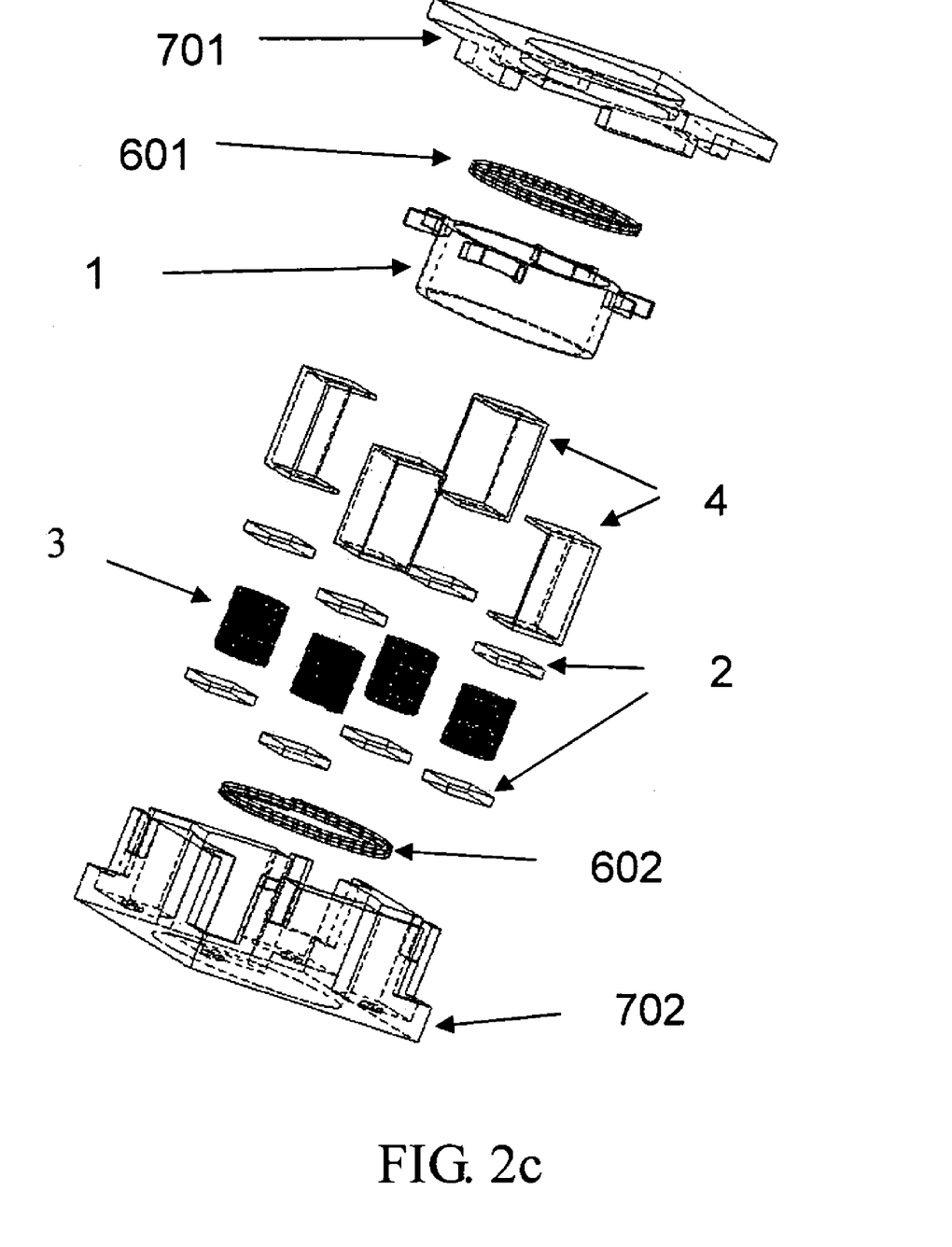

FIGS. 2a to 2c illustrate a lens actuation device according to a first embodiment of the present invention. The lens actuation device includes a housing, a carrier 1, and four transducers 5. The housing consists of an upper case 701 and a lower case 702 with hollow middle portions, and has a rectangular contour. The carrier 1 is annular-shaped, and is arranged between the upper case 701 and lower case 702. The lens is fixedly arranged in the carrier 1. The transducers 5 are electromagnetic transducers 5 symmetrically disposed between the upper case 701 and the lower case 702 and around the carrier 1. Each electromagnetic transducer 5 includes magnets 2, a coil 3, and a yoke 4. One magnet 2 is disposed on the top end of the coil 3, and the other is disposed on the bottom end of the coil 3. The yoke 4 is a rectangular column missing two column surfaces, and is arranged suitably at four corners of the rectangular-shaped housing. Two column surfaces and the top and bottom surfaces of the yoke 4 are at the same level of the inner surface of the housing, and partially warp the magnets 2 and the coil 3 from outer to inner. All the electromagnetic transducers 5 are coupled with the carrier 1 through the coil 3. The housing further includes an upper spring 601 between the upper case 701 and the carrier 1 and a lower spring 602 between the carrier 1 and the lower case 702. In this embodiment, the upper spring 601 and the lower spring 602 are coil springs with diameters larger than an inner diameter of the carrier 1, and aligned with the central axis of the carrier 1. One end of the upper spring 601 and the lower spring 602 is connected to the carrier 1, and the other end is connected to accessory (not shown) fixed on the housing. Furthermore, the upper spring 601 and the lower spring 602 may be flat springs arranged on periphery of the carrier 1. In operation, the carrier 1 moves relative to the housing 7 through the springs.

In this embodiment, the controller (not shown) is used to control the consistent or inconsistent output of the electromagnetic transducers, such that the carrier 1 drives the lens to make linear movement along the lens central axis and oblique movement deviated from the lens central axis, and controls the rotation or sway and a combined movement of linear movement and rotation or sway of the lens.

Second Embodiment

Figure 3A:
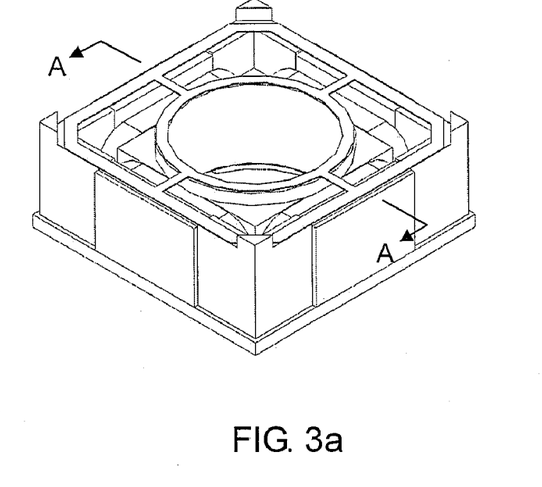
FIG. 3a is a three-dimensional view of the lens actuation device (without an upper case) according to another embodiment of the present invention.
Figure 3B:
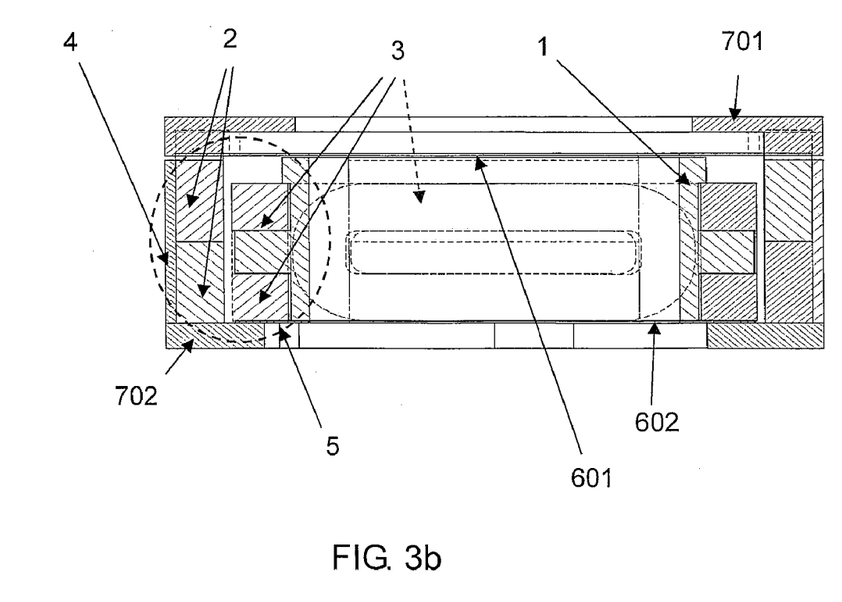
Figure 3C:
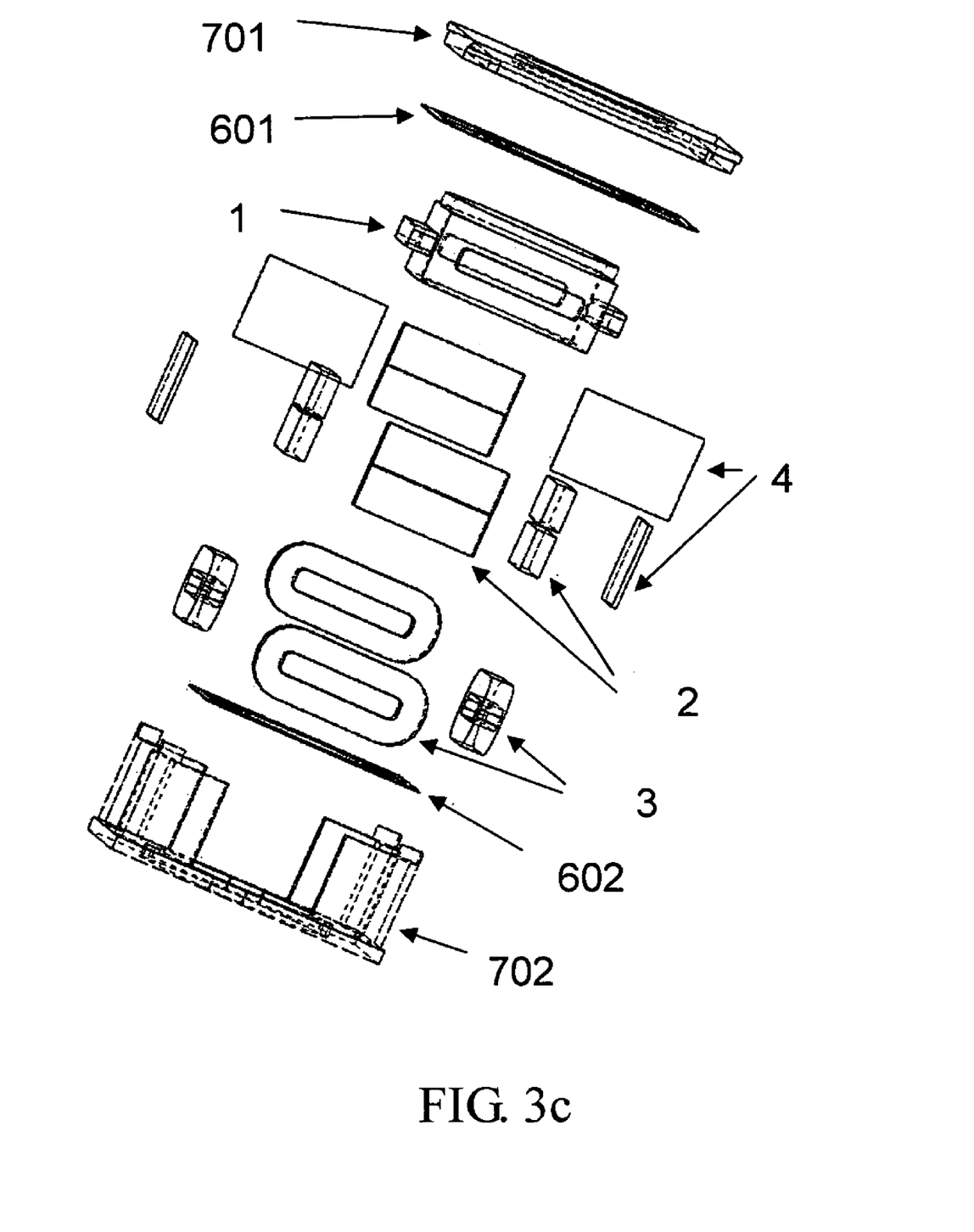

FIGS. 3a to 3c illustrate the lens actuation device according to another embodiment of the present invention. The lens actuation device includes a housing. The housing consists of an upper case 701 and a lower case 702 with hollow middle portions, and has a rectangular contour. The carrier 1 has a rectangular contour and hollow middle portion, and is arranged between the upper case 701 and lower case 702. The lens is fixedly arranged in the carrier 1. Similar to the first embodiment, the housing further includes an upper spring 601 between the upper case 701 and the carrier 1 and a lower spring 602 between the carrier 1 and the lower case 702. The upper spring 601 and the lower spring 602 are coil springs with diameters larger than an inner diameter of the carrier 1, and are aligned with the central axis of the carrier 1. One end of the upper spring 601 and the lower spring 602 is connected to the carrier 1, and the other end is connected to the housing. Four transducers are respectively disposed on four sides of the rectangle around the carrier 1. All the transducers 5 are electromagnetic transducers, and each includes a coil 3, magnets 2, and a yoke 4. Different from the first embodiment, the coil 3, magnets 2, and yoke 4 of each electromagnetic transducer are parallel to the central axis of the carrier 1 and are disposed in sequence departing from the carrier 1. Fixing heads project from four sides of the carrier 1, and the coil has fixing slots matching up with the fixing heads. The fixing heads are fixedly suited in the fixing slots, so as to connect the coils 3 and the carrier 1.

In this embodiment, the controller (not shown) may also be used to control the consistent or inconsistent output of the electromagnetic transducers, such that the carrier 1 drives the lens to make linear movement along the lens central axis and oblique movement deviated from the lens central axis, and controls the rotation or sway and a combined movement of linear movement and rotation or sway of the lens.

Third Embodiment

FIGS. 4a to 4f illustrate the lens actuation device according to still another preferred embodiment of the present invention. The lens actuation device includes a housing 7, a carrier 1, and four transducers disposed around the carrier 1. The housing 7 consists of an upper case 701 and a lower case 702 with hollow middle portions, and has a rectangular contour.

Figure 4A:
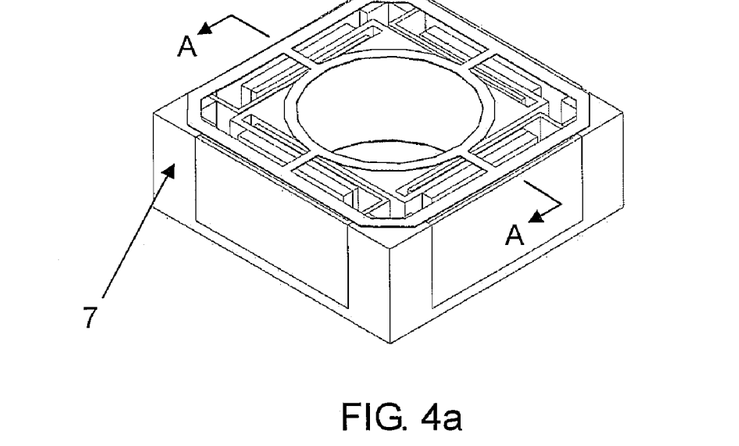
FIG. 4a is a three-dimensional view of the lens actuation device (without an upper case) according to still another embodiment of the present invention.
Figure 4B:
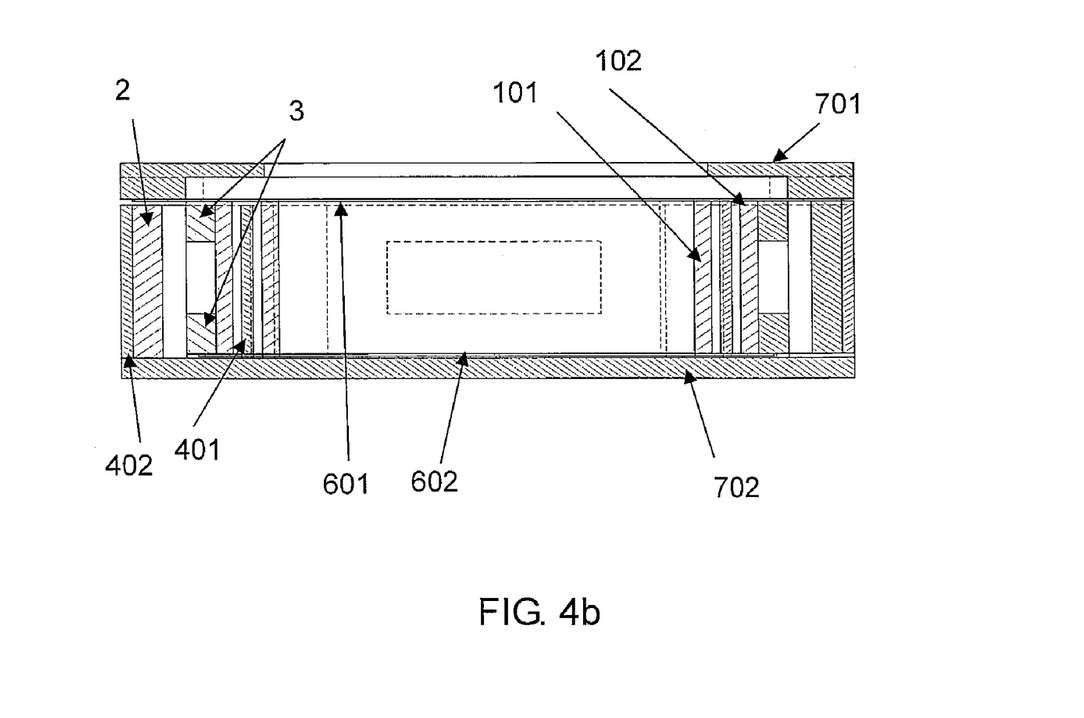
Figure 4C:
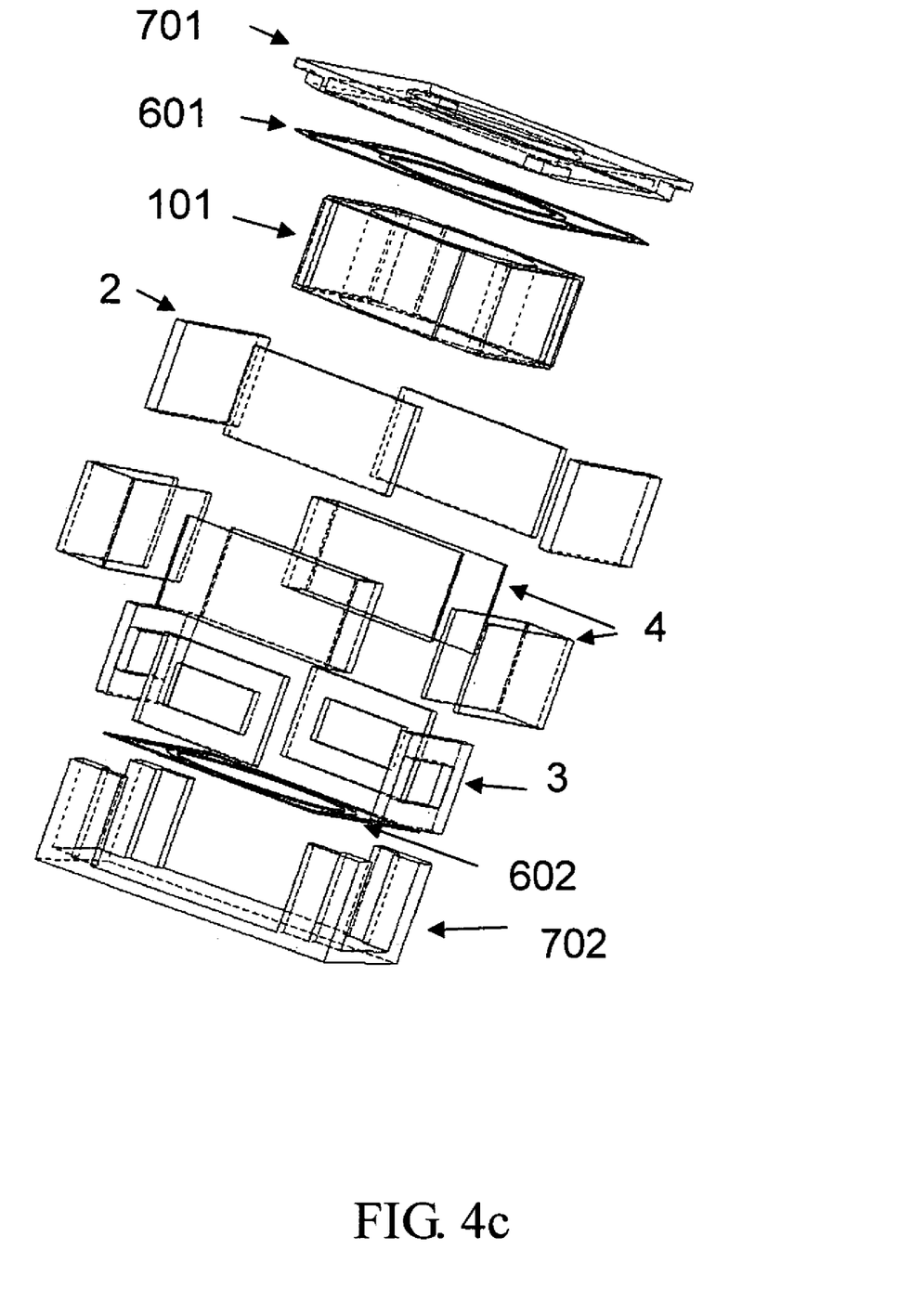

The carrier 1 is arranged in the housing 7, and have the top and bottom respectively connected with the upper and lower cases 701, 702 through the upper and lower springs 601, 602. The arrangement of the springs is similar to that of Embodiment 2. As shown in FIG. 4a, the carrier 1 includes a body 101 having a rectangular contour, and the body 101 has a round through hole in which the lens is installed.

Four corners of the rectangular body 101 extend outwards to form four extending portions 102. Four transducers are respectively disposed on four sides of the rectangular body 101, and are electromagnetic transducers each including a coil 3, magnets 2, and a yoke, 4. All the electromagnetic transducers are coupled with the carrier 1 respectively through the coil 3. The yoke 4 includes a first magnetic conductive portion 401 and a second magnetic conductive portion 402 in parallel with the corresponding sides of the rectangular body 101. The first magnetic conductive portion 401 is near the body 101, and the second magnetic conductive portion 402 leans against the housing 7. The magnets 2 and the coil 3 are located between the first magnetic conductive portion 401 and the second magnetic conductive portion 402. The extending portion 102 extends to a place between the first and the second magnetic conductive portion, and is fixedly connected with the coil 3. The extending portion 102 is L-shaped. The short edge of the L-shape is connected to the corresponding side of the body 10, and the coil 3 is fixed on the outer side of the long edge of the L-shape or inside the L-shape. The first magnetic conductive portion 401 and second magnetic conductive portion 402 are connected end to end, so as to form a recess structure with a lateral opening, and the magnets 2 and the coil 3 are located inside the recess structure.

In this embodiment, the controller (not shown) may also be used to control the consistent or inconsistent output of the electromagnetic transducers, such that the carrier 1 drives the lens to make linear movement along the lens central axis and oblique movement deviated from the lens central axis, and controls the rotation or sway and a combined movement of linear movement and rotation or sway of the lens.

Figure 4D:
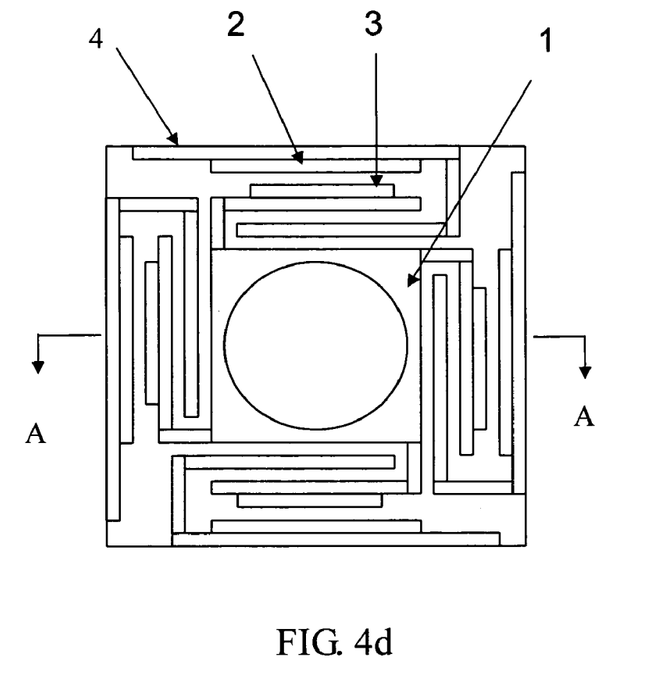
Figure 4E:
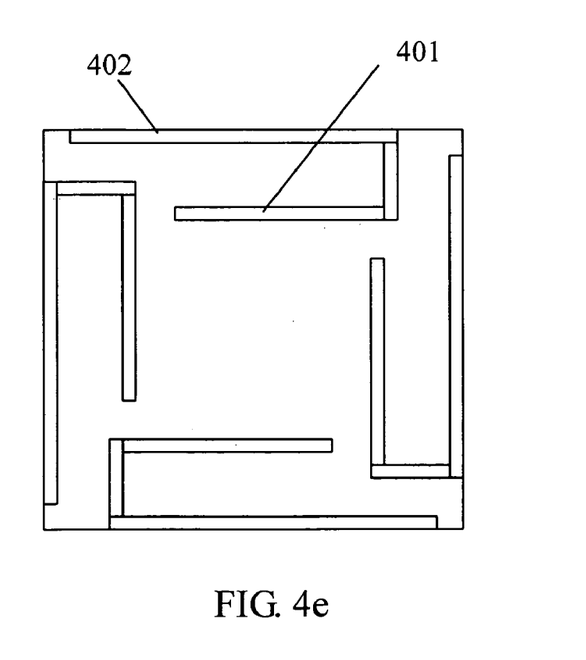
FIG. 4e is a schematic structural view of a yoke in the lens actuation device of FIG. 4d.
Figure 4F:
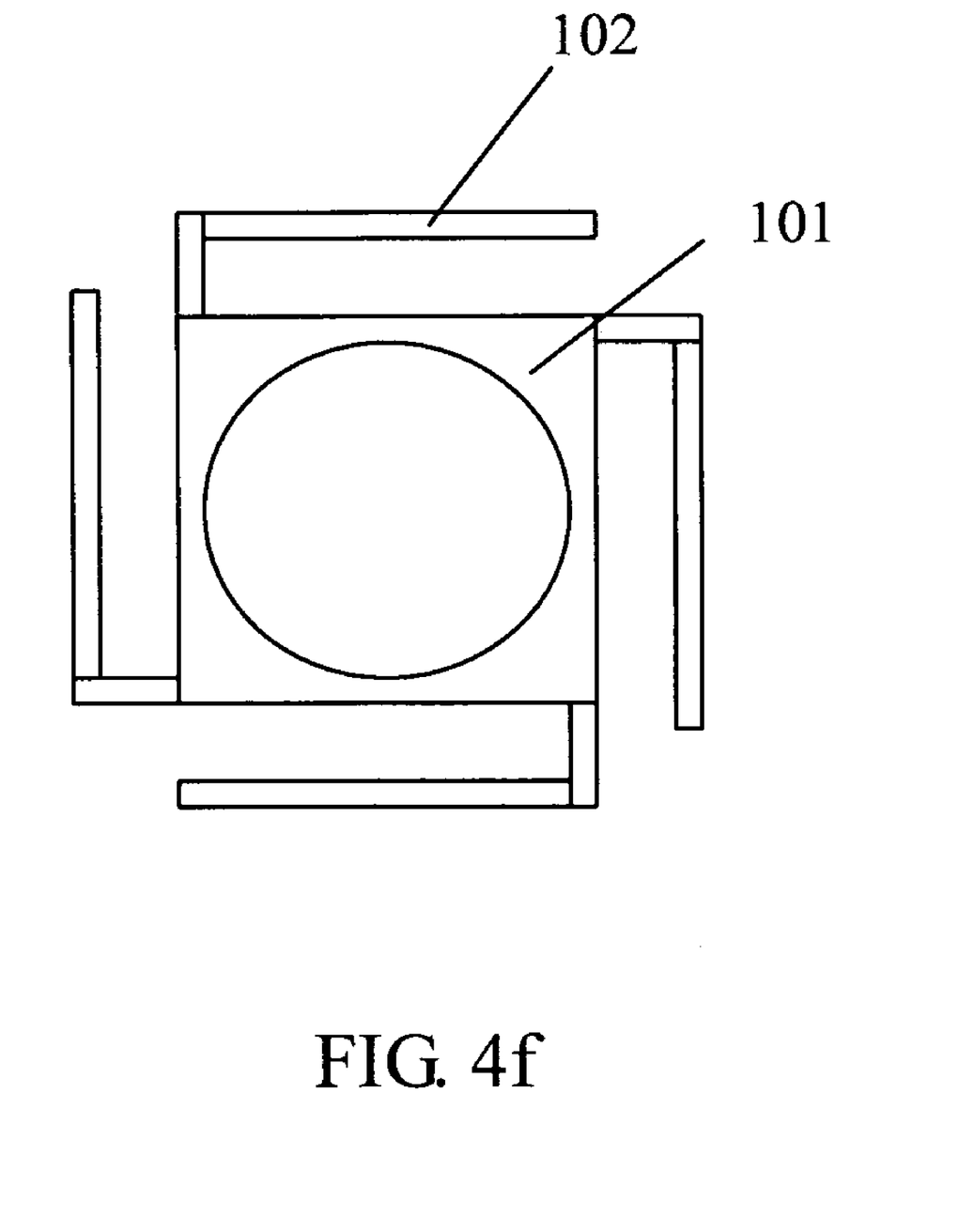
FIG. 4f is a schematic structural view of the carrier in the lens actuation device of FIG. 4d.

Referring to FIGS. 4d and 4f, through the improvement of the arrangement of the yoke 4, a better semi-closed magnetic circuit is provided, which improves the performance of the transducers for driving the carrier 1.

In the above embodiments, at least one transducer is a piezoelectric actuator or a transducer. In addition, at least one or at least two transducers may be an actuator or a transducer of any kinds as long as the actuator or transducer can make the carrier to generate linear movement. The yoke may consist of one or a plurality of magnetic conductors. Each transducer may be equipped with one yoke or the transducers share the yoke.

In the present invention, the transducers may be individually controlled to generate independent movement, so as to achieve the rotation or sway of the carrier. The rotation or sway may be used for image stabilization or vibration compensation of the photographic system. The transducers may be cooperatively controlled to make consistent movement, thereby achieving the linear movement of the carrier. The linear movement of the carrier along central axis may achieve the auto-focus function of the camera lens. The transducers may be accurately controlled to make consistent movement or independent movement at any time, and switch between two movement modes, thereby achieving independent linear movement, independent rotation, or sway or a combined movement of any two of the above movements of the carrier. Therefore, the independent auto-focus function, independent vibration compensation function, or both can be achieved.

In another aspect of the present invention, an optical system is provided, which includes an aforementioned lens actuation device and a lens arranged in the carrier of the lens actuation device. The detailed implementation of the optical system may refer to the description of the lens actuation device in the above embodiments.

In still another aspect of the present invention, a camera is further provided, which includes an aforementioned lens actuation device, a lens arranged in the carrier of the lens actuation device, a camera sensor, a spacer arranged between the lens actuation device and the camera sensor, and a controller for driving the lens actuation device. The detailed implementation of the camera may refer to the description of the lens actuation device in the above embodiments.

When the optical system and camera of the present invention operate, the controller is used to send instructions to drive the lens actuation device to carry the arranged lens to move, thereby achieving the control and adjustment of the lens and the aforementioned actuation effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens actuation device for an optical system, comprising:

a housing;

a carrier, at least partially arranged in the housing; and a plurality of transducers, coupled to said carrier and substantially evenly spaced around said carrier within said housing;

wherein one or more of the plurality of transducers includes at least one magnet, at least one coil, and at least one yoke;

wherein said carrier comprises a body having a rectangular cross-section comprising four corners, said body further comprising four extending portions extending outward from said four corners;

wherein said at least one yoke comprises a first magnetic conductive portion and a second magnetic conductive portion positioned in parallel with a side of said body, and wherein said second magnetic conductive portion is positioned so as to contact said housing, and wherein said at least one magnet and said at least one coil are located between said first magnetic conductive portion and said second magnetic conductive portion;

wherein said extending portions extend from said body to locations between said first and second magnetic conductive portions, and wherein said extending portions are fixed to said coil;

wherein said extending portions comprise an "L" shape, wherein a shorter edge of the "L" shape is connected to a corresponding side of said body, and wherein said at least one coil is fixed to an outer side of a long edge of the "L" shape or inside the"L" shape; and wherein said first magnetic conductive portion and said second magnetic portion are connected end-to-end, so as to form a recess structure with a lateral opening, and wherein said magnets and said at least one coil are positioned inside the recess structure.

2. The lens actuation device according to claim 1, wherein said one or more of the plurality of transducers is independently equipped with at least one yoke, or shares at least one yoke with at least another transducer.

3. The lens actuation device according to claim 1, wherein the at least one yoke comprises one or more magnetic conductors.

4. The lens actuation device according to claim 1, further comprising one or more springs having one end in contact with the carrier, and the other end in contact with the housing or an accessory fixed on the housing.

5. The lens actuation device according to claim 4, wherein the one or more springs comprise coil springs with diameters larger than an inner diameter of the carrier and aligned with a central axis of the carrier.

6. The lens actuation device according to claim 4, wherein the one or more springs comprise flat springs arranged on a periphery of the carrier.

7. The lens actuation device according to claim 1, wherein the one or more of the plurality of transducers are individually controlled to make independent movement, so as to achieve rotation or sway of the carrier.

8. The lens actuation device according to claim 1, wherein the one or more of the plurality of transducers are cooperatively controlled to make substantially the same movement consistently, so as to achieve linear movement of the carrier.

9. The lens actuation device according to claim 1, wherein the one or more of the plurality of transducers are accurately controlled to make consistent movement or independent movement at any time, and switch between two movement modes, thereby achieving independent linear movement, independent rotation, or sway or a combined movement of any two of the above movements of the carrier.

10. The lens actuation device according to claim 1, wherein at least one transducer of the one or more of the plurality of transducers comprises a piezoelectric actuator or transducer.

11. An optical system, comprising:
a lens actuation device according to claim 1; and
a lens arranged in the carrier of the lens actuation device.

12. A camera, comprising:
a lens actuation device according to claim 1;
a lens arranged in the carrier of the lens actuation device;
an image sensor;
a spacer arranged between the lens actuation device and the image sensor; and
a controller for driving the transducers of the lens actuation device.

* * * * *